United States Patent [19]

Lineberry

[11] 4,095,963

[45] Jun. 20, 1978

[54] STABILIZATION OF DEODORIZED EDIBLE OILS

[75] Inventor: Dewey D. Lineberry, Louisville, Ky.

[73] Assignee: Chemetron Corporation, Chicago, Ill.

[21] Appl. No.: 769,809

[22] Filed: Feb. 17, 1977

[51] Int. Cl.$^2$ .............................................. B01D 19/00

[52] U.S. Cl. ........................................... 55/54; 203/6; 260/428

[58] Field of Search .................... 55/54; 203/6, 29, 53, 203/96; 252/397; 260/428

[56] References Cited

U.S. PATENT DOCUMENTS

| | | | |
|---|---|---|---|
| 2,773,081 | 12/1956 | Brown et al. | 260/428 X |
| 3,221,059 | 11/1965 | Fukui et al. | 260/428 X |
| 3,414,129 | 12/1968 | Going et al. | 260/428 X |
| 3,693,322 | 9/1972 | Lineberry et al. | 55/54 |
| 3,733,202 | 5/1973 | Marmor | 260/428 X |
| 3,821,265 | 6/1974 | Forster et al. | 203/6 X |

OTHER PUBLICATIONS

Kirk–Othmer, Encyclopedia of Chemical Technology, vol. 8, pp. 805–807 and vol. 13, pp. 654, 655, 2nd Ed.

*Primary Examiner*—Charles N. Hart
*Assistant Examiner*—Robert H. Spitzer
*Attorney, Agent, or Firm*—Jones, Tullar & Cooper

[57] ABSTRACT

This invention relates to the stabilization of deodorized edible oils. In the process of the invention, edible oils are steam deodorized in the presence of a peroxide inhibiting amount of molybdenum metal or molybdenum oxide. It has been further found that the stabilizing effect of molybdenum metal or molybdenum oxide is obtained even in the presence of pro-oxidant metals.

9 Claims, 2 Drawing Figures

STABILIZATION OF DEODORIZED EDIBLE OILS

STATE OF THE ART

Oils and fats, for a long time, have been deodorized by treatment with steam, with the exclusion of oxygen, in batch, semicontinuous and continuous processes using apparatus appropriate to each; see, for example, U.S. Pat. No. 3,693,322 and Kirk-Othmer, "Encyclopedia of Chemical Technology", *Fats and Fatty oils, Vol.* 8, pages 766–811, Interscience Publishers, New York (1965). Virtually all the vegetable oil entering edible fat products is subjected to deodorizing treatment for flavor improvement and odor removal.

Deodorization is a process of steam distillation in which the relatively non-volatile oil is maintained at a high temperature and under reduced pressure while it is stripped of the relatively volatile constituents responsible for off flavor and odor. In the manufacture of edible products, deodorization is almost invariably the last step in processing before finishing and packaging.

Preferably, prior to deodorization, the edible oil is usually subjected to refining, usually alkali refining, bleaching or decolorization, optionally followed by hydrogenation. These techniques are described in Kirk-Othmer loc. cit.

Most edible oils, in their crude state, have natural anti-oxidants. It has been noted in the art that processed edible oils, especially after being steam deodorized, tend to have an increased tendency toward oxidation, rancidification or, what is commonly referred to in the art as, reversion.

Reversion of edible oils is known to be accelerated by contact with pro-oxidant metals or their salts, such as for example, cooper, iron, lead, manganese and cobalt.

It is noted that 316 stainless steel, which contains molybdenum is and has been for some time preferred for the construction of deodorizing vessels, because oils deodorized in vessels made from 316 stainless steel exhibit less reversion than those processed in 304 stainless steel or carbon steel.

DESCRIPTION OF THE INVENTION

It has now been discovered that conducting steam deodorization of edible oils in contact with a stabilizer which is molybdenum or molybdenum oxide reduces the initial peroxide value of the oil and retards the subsequent increase in peroxide value of the oil in storage, as compared to the same oil steam deodorized in the absence of molybdenum metal or molybdenum oxide. This effect is noted even in the presence of pro-oxidant metals.

The amount of molybdenum metal or molybdenum oxide contacted with the edible oil is at least a stabilizing amount sufficient to provide a reduction in the initial peroxide value, as compared to the peroxide value of the same oil treated in the absence of the stabilizer. The exact amount of stabilizer necessary apparently varies with the amount of unsaturation present in the oil, and is apparently particularly dependent on the presence of linolenic acids. It is noted that the relative rate of oxidation in the series of linoleic acid, linolenic acid and arahidonic acid increases with the addition of each active methylene group. Soybean oil is particularly subject to reversion and requires the presence of significantly more stabilizer than does palm oil which has lower unsaturation, and particularly lower levels or the absence of significant amounts of linolenic acids.

Typically, the stabilizing amount of molybdenum metal or molybdenum oxide employed with an oil such as soybean oil in an amount to provide a surface area of between about 33 square inches to about 66 square inches of metal or metal oxide per liter of oil. For oils inherently more stable than soybean oil, lesser amounts of molybdenum can typically be employed. In some cases, amounts as low as 4 square inches per liter or even less can have a useful effect.

Preferably, the amount of molybdenum metal or molybdenum oxide employed is an amount sufficient to provide a peroxide value in the deodorized fat or oil, after three days accelerated aging in the Oven Test, (determined by AOCS Official Method Cd 8-53) of less than about 10 and most preferably less than about 5.

The molybdenum metal or molybdenum oxide may be used per se or may be coated or impregnated on a support such as alumina or other inert support material such as those known in the catalyst industry.

The molybdenum or molybdenum oxide is preferably employed in a form that presents a substantial surface area for contact with the edible fat or oil being treated, for example, strands of wires, chips, granules, etc. Since it is obviously desirable to separate the molybdenum or molybdenum oxide from the oil after treatment is complete, it is preferred where very finely divided material is employed, which will not readily separate from the oil, that the finely divided material be fixed to an inert carrier or support material.

The molybdenum metal or molybdenum oxide is contacted with the fat or oil during the steam deodorization process in any practical manner. Usually, it is placed at the bottom of the steam distillation vessel, for example, in the tray described in U.S. Pat. No. 3,693,332. Since in the steam deodorization process the steam provides substantial agitation of the fat and oil, adequate contact with the molybdenum metal or molybdenum oxide is readily accomplished.

Alternatively, if desired, a portion of the wetted surface of the deodorizer surface can be constructed of molybdenum, thereby providing the molybdenum surface area necessary to provide the desired stabilizing effect.

The steam deodorization processes known in the art are conducted at an elevated temperature. While the temperature is not unduly critical and is governed, in part, by the type of oil being treated, it is preferred that the edible oil be contacted with the stabilizer at a temperature above about 400° F, and preferably between 440° and about 540° F.

While the process of the invention can be practiced in conjunction with any of the known steam deodorization processes, the preferred process and apparatus is that described in U.S. Pat. No. 3,693,322, which is hereby incorporated by reference.

The edible oils which can be stabilized by the process of the invention include edible vegetable oils, such as the oleic-linoleic acid oils, which are of medium, but rather variable unsaturation (iodine values varying from about 50 for palm oil to about 120 for corn oil with no fatty acids more unsaturated than linoleic) and include palm oil, cottonseed oil, peanut oil, corn oil, safflower oil, sesame oil and sunflower oil; Erucic acid oils (containing minor amounts of linolenic acid) including rapeseed oil, ravision oil and mustardseed oil; as well as linolenic acid oils, most importantly soybean oil (see Kirk-Othmer loc. cit.).

While vegetable oils including unhardened oils, hardened oils and winterized oils are of particular interest, the process of the invention is also applicable to other edible fats and oils of commerce such as animal fats and whale and fish oils.

The invention is further described in conjunction with the following examples which are to be considered illustrative, rather than limiting the invention to their details. All parts and percentages throughout the specification are by weight unless otherwise specified. All temperatures are degrees Farenheit unless otherwise specified.

A number of deodorization processes, described in the following examples, were conducted in a 750 ml glass wall deodorizer with internal wetted metal parts constructed of metals set forth below. The design and functioning deodorizer were as described in U.S. Pat. No. 3,693,322, previously incorporated by reference. Peroxide Values were determined by A.O.C.S. Official Method Cd 8-53.

EXAMPLE 1

In this group of runs, the oil treated was refined and bleached undeodorized soybean oil where 1 oz. molybdenum wire was employed, the wire was ⅛ inch in diameter, ½ long having 4.8 square inches of contact surface within the oil being deodorized.

Sample No. 1 - 0

Refined and bleached undeodorized soybean oil.

Test Run 1 - 1

All wetted metals parts made of 316 stainless steel including the heating coil.

Test Run 1 - 2

All wetted metal parts made of 316 stainless steel including the heating coil plus 1 oz. molybdenum wire resting on tray bottom.

Test Run 1 - 3

All wetted metal parts made of 316 stainless steel except the heating coil which was made of 304 stainless steel.

Test Run 1 - 4

All wetted metal parts made of 316 stainless steel except the heating coil which was made of 304 stainless steel plus 1 oz. molybdenum wire resting on tray bottom.

Test Run 1 - 5

All wetted metals made of 316 stainless steel except the heating coil which was made of high carbon steel tubing.

Test Run 1 - 6

All wetted metal parts made of 316 stainless steel except the heating coil which was made of high carbon steel tubing plus 1 oz. molybdenum wire resting on tray bottom.

Sample No. 1 - 7

Refined and bleached undeodorized soybean oil. (Same lot as 1-0)

Test Run 1 - 8

Repeat of Test Run 1 - 6. All wetted metal parts made of 316 stainless steel except the heating coil which was made of high carbon steel tubing, plus 1 oz. molybdenum wire resting on tray bottom.

Test Run 1 - 9

Repeat of Test Run 1 - 5. All wetted metal parts made of 316 stainless steel except the heating coil which was made of high carbon steel tubing.

All the deodorization runs were conducted by deodorizing a 750 ml refined and bleached soybean oil for 1 hour at 485° F. using 3% stripping steam.

| Sample No. | PEROXIDE VALUE Initial[1] | 24 | 48 | 72 | 96 | 120 | 144 | 168 Hrs. | Free Fatty Acid[2] |
|---|---|---|---|---|---|---|---|---|---|
| 1–0 | 2.9 | 13.5 | 21.1 | 32.8 | — | — | 70.2 | 82.5 | 0.04% |
| 1–1 | .85 | 16.6 | 26.3 | 26.3 | — | — | 62.4 | 77.6 | 0.018% |
| 1–2 | 1.1 | 5.4 | 14.2 | 24.9 | — | — | 36.7 | 78.3 | 0.014% |
| 1–3 | .54 | 5.0 | 10.2 | 21.1 | — | — | 45.8 | 54.5 | 0.014% |
| 1–4 | .22 | 1.5 | 12.6 | 18.7 | — | — | 39.1 | 59.2 | 0.013% |
| 1–5 | 1.52 | 4.6 | 16.3 | — | — | 36.5 | 34.8 | — | |
| 1–6 | 2.61 | 1.7 | 9.6 | — | — | 21.7 | 30.0 | — | 0.014% |
| 1–7 | 3.70 | 9.7 | 16.5 | — | — | 33.5 | 63.0 | — | 0.049% |
| 1–8 | .22 | 1.0 | 5.1 | — | 16.9 | 28.7 | 38.3 | — | 0.014% |
| 1–9 | .22 | 1.0 | 1.2 | | 8.0 | 18.0 | 22.0 | — | 0.014% |

[1] 1–4 hours after deodorization
[2] Free Fatty Acids were determined by Ca 5a –40 from AOAC; determined on freshly deodorized sample

EXAMPLE 2

In this group of runs, the glass walled deodorizer was equipped with internal parts of 316 stainless steel, except that the heating coil was 304 stainless.

The materials treated were refined and bleached soybean oil, cottonseed oil, and sunflower oil, as well as bleached palm oil.

The molybdenum employed was in the form of the wire described in Example 1.

The deodorizer was operated as in Example 1.

Test Run (1-10)

750 ml refined and bleached soybean oil without molybdenum present.

Test Run (1-11)

750 ml refined and bleached soybean oil with 1 oz. molybdenum present.

Test Run (1-12)

750 ml refined and bleached cottonseed oil with 1 oz. molybdenum present.

Test Run (1-13)

750 ml refined and bleached cottonseed oil without molybdenum present.

Test Run (1-14)

750 ml bleached palm oil without molybdenum present.

Test Run (1-15)

750 ml bleached palm oil with 1 oz. molybdenum present.

Test Run (1-16)

750 ml refined and bleached sunflower oil with 1 oz. molybdenum present.

Test Run (1-17)

750 ml refined and bleached sunflower oil without molybdenum present.

Test Runs (1-18, 1-19)

750 ml refined and bleached soybean oil with 3 ozs. molybdenum present.

Test Run (1-21)

750 ml refined and bleached cottonseed oil with 3 ozs. molybdenum present.

Test Run (1-22)

750 ml refined and bleached sunflower oil with 3 ozs. molybdenum present.

After deodorization trace metal analysis for molybdenum on both the doedorized oils and the undeodorized oil showed no molybdenum levels above 0.1 ppm.

The deodorized samples were subjected to a 10 day accelerated aging test at 63° C. This test is known in the industry as the Oven Test or Schaal Test. Experience has shown this test to be equivalent to 1–2 months storage at 90° F or 2–4 months at 70° F.

Figure 1:
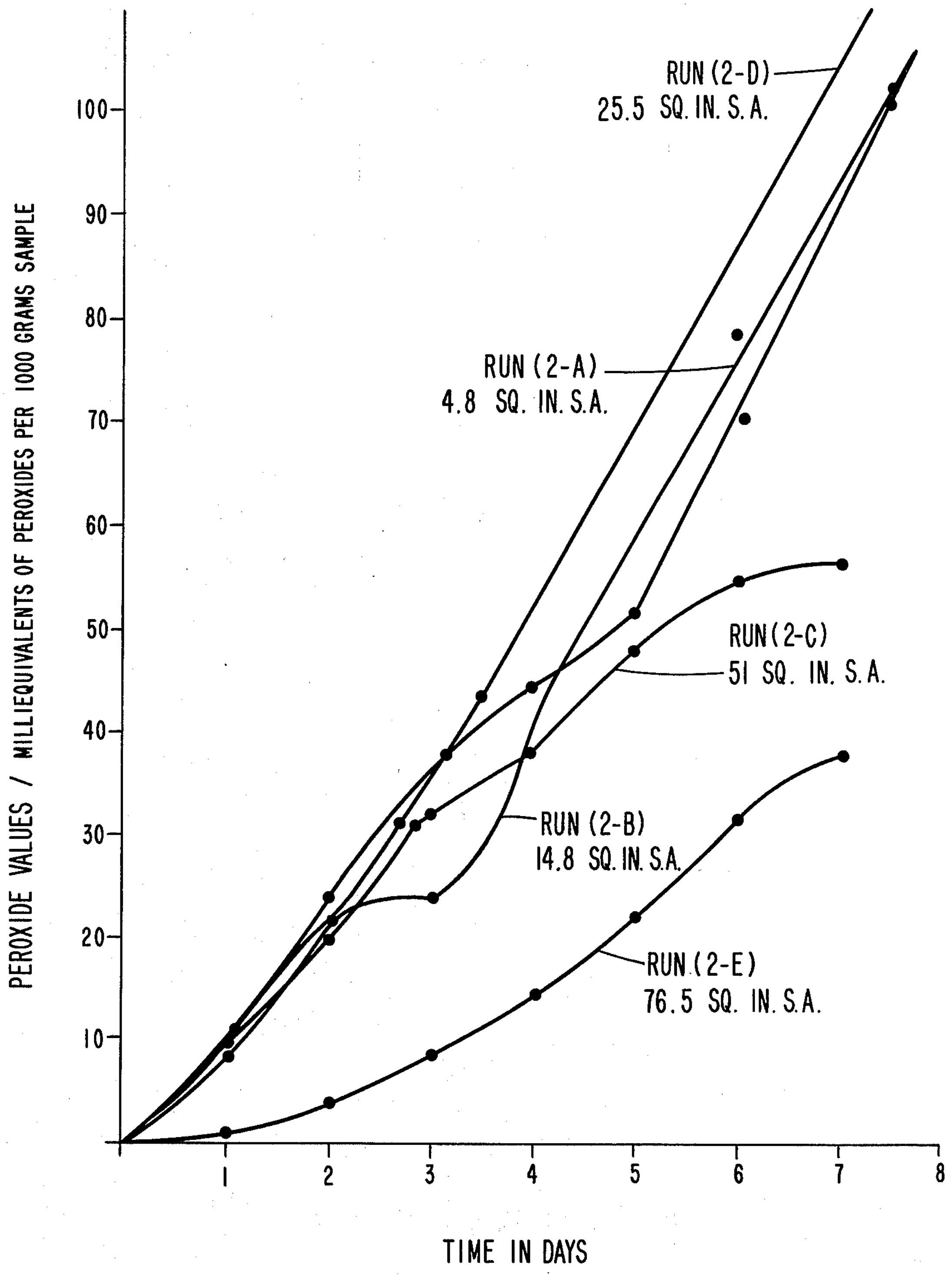
FIG. 1 shows the results plotting peroxide value vs time.
Figure 2:
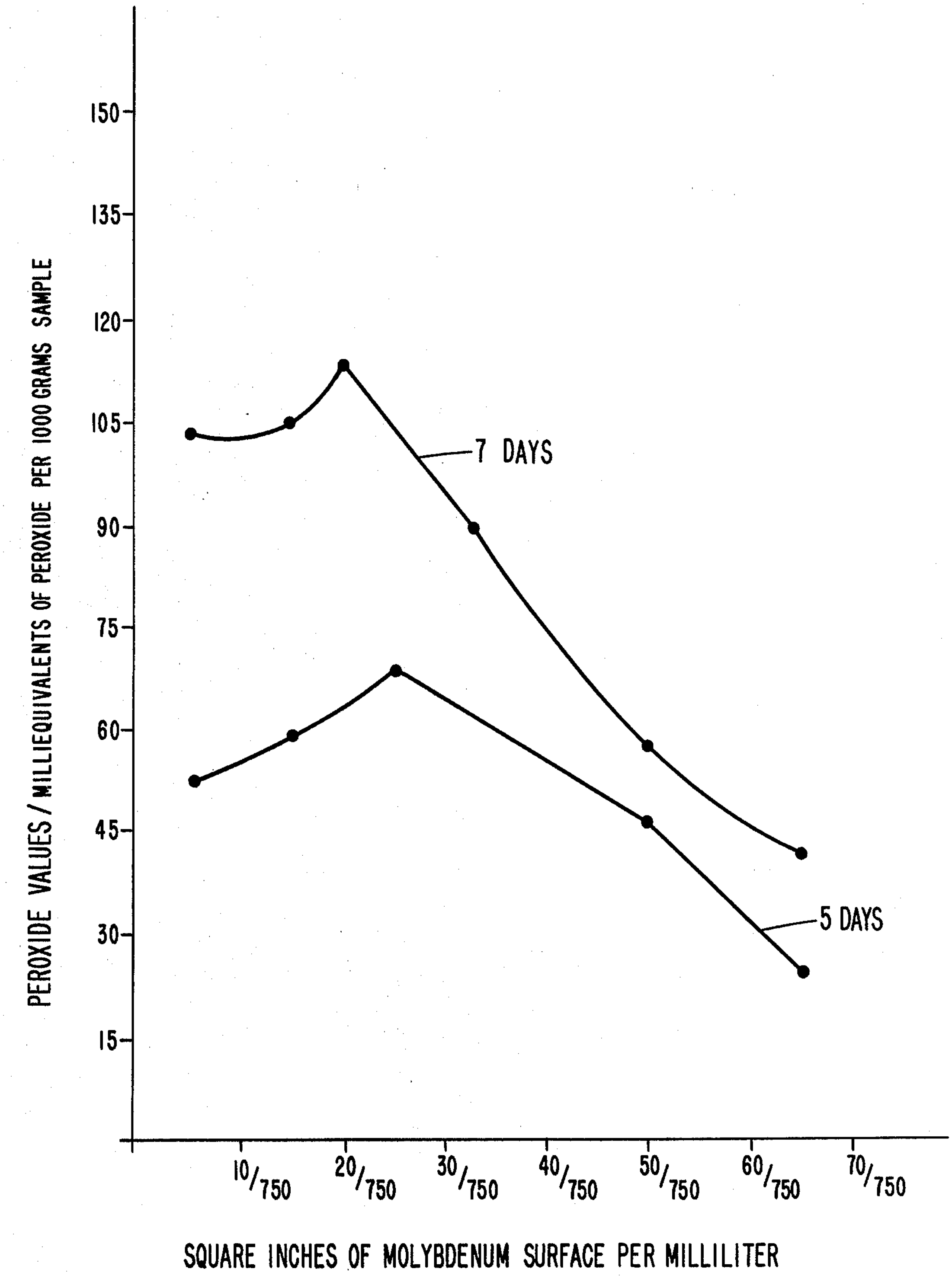
FIG. 2 shows peroxide value vs surface area of molybdenum contacted at 5 and 7 days.

As can be seen from FIG. 2 oil stability appears to display a threshold value above which an increase in molybdenum surface area contacted significantly affects oil stability.

| SAMPLE | PEROXIDE VALUE | | | | | | | | | | | FREE FATTY |
|---|---|---|---|---|---|---|---|---|---|---|---|---|
| NUMBER | INITIAL | 24 | 48 | 72 | 96 | 120 | 144 | 168 | 192 | 216 | 240 (Hrs.) | ACID |
| 1-1 | .85 | 7.2 | 16.3 | 26.3 | — | — | 62.4 | 77.6 | — | — | — | .018% |
| 1-1 | 1.1 | 5.4 | 14.2 | 24.9 | — | — | 36.7 | 78.3 | — | — | — | .014% |
| 1-10 | 1.4 | 22.2 | 30.6 | 39.8 | 43.5 | 48.3 | 73.5 | — | — | — | — | .024% |
| 1-11 | 1.6 | 24.7 | 36 | 44.8 | 52 | 56.9 | 80.7 | — | — | — | — | .015% |
| 1-12 | 1.03 | 7.61 | 25.5 | 39 | 51.5 | 66 | 63 | — | — | — | — | .015% |
| 1-13 | 1.02 | 5.6 | 19.5 | 29.1 | 44.8 | 56 | 65.2 | — | — | — | — | .01% |
| 1-14 | .26 | — | 5.2 | 7.8 | 14.7 | 16.8 | 20 | — | — | — | 34.6 | .024% |
| 1-15 | .2 | — | 3.7 | 5.4 | 10.2 | 15.2 | 15.8 | — | — | — | 21.9 | .017% |
| 1-16 | 0 | 6.3 | 18.8 | — | — | — | 41.4 | — | — | 116 | 143 | .013% |
| 1-17 | 0 | 10.9 | 19.7 | — | — | — | 43.1 | — | — | 103 | 131 | .015% |
| 1-18 | 0 | 9.3 | 19.4 | 19.5 | — | — | — | — | — | — | — | — |
| | 0 | 4.9 | — | 29.4 | 23.9 | — | — | 175 | — | 358 | — | — |
| 1-19 | 0 | 5.7 | 18.3 | 18.9 | — | — | — | — | — | — | — | — |
| | 0 | 4.3 | — | 18 | 14.3 | — | — | 225 | — | 472 | — | — |
| 1-21 | 0 | — | 6.5 | 13.2 | 11 | 16 | 14 | 17 | 31 | 19 | 18 | — |
| 1-22 | 0 | — | 9.3 | 11 | 9 | 14 | 17 | 15 | 23 | 34 | 24 | — |

EXAMPLE 3

In this group of runs, the glass walled deodorizer was equipped with internal parts of 316 stainless steel, except that the heating coil was 304 stainless. The oil treated was refined and bleached soybean oil. The object of these tests was to demonstrate the effect molybdenum surface area as it relates to stabilization of the oil. The following samples were deodorized as in the previous examples using the indicated increasing amounts of molybdenum surface.

Test Run (2-A)

750 ml oil with 1 oz. molybdenum wire- 4.8 square inches surface area.

Test Run (2-B)

750 ml oil with 3 oz. molybdenum wire- 14.8 square inches surface area.

Test Run (2-C)

750 ml oil with 1 oz. molybdenum chips- 51.0 square inches surface area.

Test Run (2-D)

750 ml oil with 0.5 oz. molybdenum chips- 25.5 square inches surface area.

Test Run (2-E)

750 ml oil with 1.5 oz. molybdenum chips- 76.5 square inches surface area.

While there has been described above the invention and what are now considered its best embodiments it is understood that other materials and equipment such as described above may be substituted for those exemplified. All parts and percentages set forth are by weight unless otherwise specified.

What is claimed is:

1. In a process of steam deodorizing edible animal and vegetable fats and oils the improvement which comprises conducting the steam deodorization in contact with a peroxide value stabilizing amount of molybdenum metal, molybdenum oxides or mixtures thereof, which has been added to the apparatus in which the steam deodorization is conducted.

2. A process, as in claim 1, where molybdenum metal is employed.

3. A process, as in claim 2, where the edible fat or oil is heated to a temperature of at least about 400° F.

4. A process, as in claim 3, where molybdenum metal is employed.

5. A method, as in claim 2, where the oil is an unsaturated vegetable oil.

6. A method, as in claim 5, where molybdenum metal is employed.

7. A method, as in claim 5, where the edible oil is heated to a temperature of a least about 400° F.

8. A method, as in claim 7, where the oil is selected from the group consisting of soybean oil, cottonseed oil, palm oil, and sunflower seed oil and rapeseed oil.

9. A method, as in claim 1, where the amount of molybdenum or molybdenum oxide has a surface area between about 33 square inches and 66 square inches per liter of oil being contacted.

* * * * *